No. 686,105. Patented Nov. 5, 1901.
F. W. MEYER & C. HORST.
FLUSHING VALVE.
(Application filed Jan. 23, 1901.)
(No Model.) 2 Sheets—Sheet I.

No. 686,105. Patented Nov. 5, 1901.
F. W. MEYER & C. HORST.
FLUSHING VALVE.
(Application filed Jan. 23, 1901.)

(No Model.) 2 Sheets—Sheet 2.

Witnesses
M. E. Fowler
W. Cleary Sullivan

Inventors:
Fred W. Meyer
and Christian Horst
By Alexander & Dowell
Attorneys.

THE NORRIS PETERS CO., PHOTO-LITHO., WASHINGTON, D. C.

UNITED STATES PATENT OFFICE.

FRED WILLIAM MEYER AND CHRISTIAN HORST, OF LOUISVILLE, KENTUCKY.

FLUSHING-VALVE.

SPECIFICATION forming part of Letters Patent No. 686,105, dated November 5, 1901.

Application filed January 23, 1901. Serial No. 44,473. (No model.)

*To all whom it may concern:*

Be it known that we, FRED WILLIAM MEYER and CHRISTIAN HORST, of Louisville, Jefferson county, Kentucky, have invented certain new and useful Improvements in Flushing-Valves; and we hereby declare that the following is a full, clear, and exact description thereof, reference being had to the accompanying drawings, which form part of this specification.

This invention is an improvement in flushing-valves; and its object is to provide a novel construction of automatically-closing valve whereby when the valve is once unseated it will be gradually closed, thus permitting a quantity of water to escape into a tank or closet or receptacle, adapting the valve for use in connection with water-closets, sinks, &c., and wherever it is desired to flush a pipe or vessel after use or at intervals.

The invention therefore consists in the novel construction and combination of parts, as hereinafter described and claimed with reference to the accompanying drawings, in which—

Figure 1:
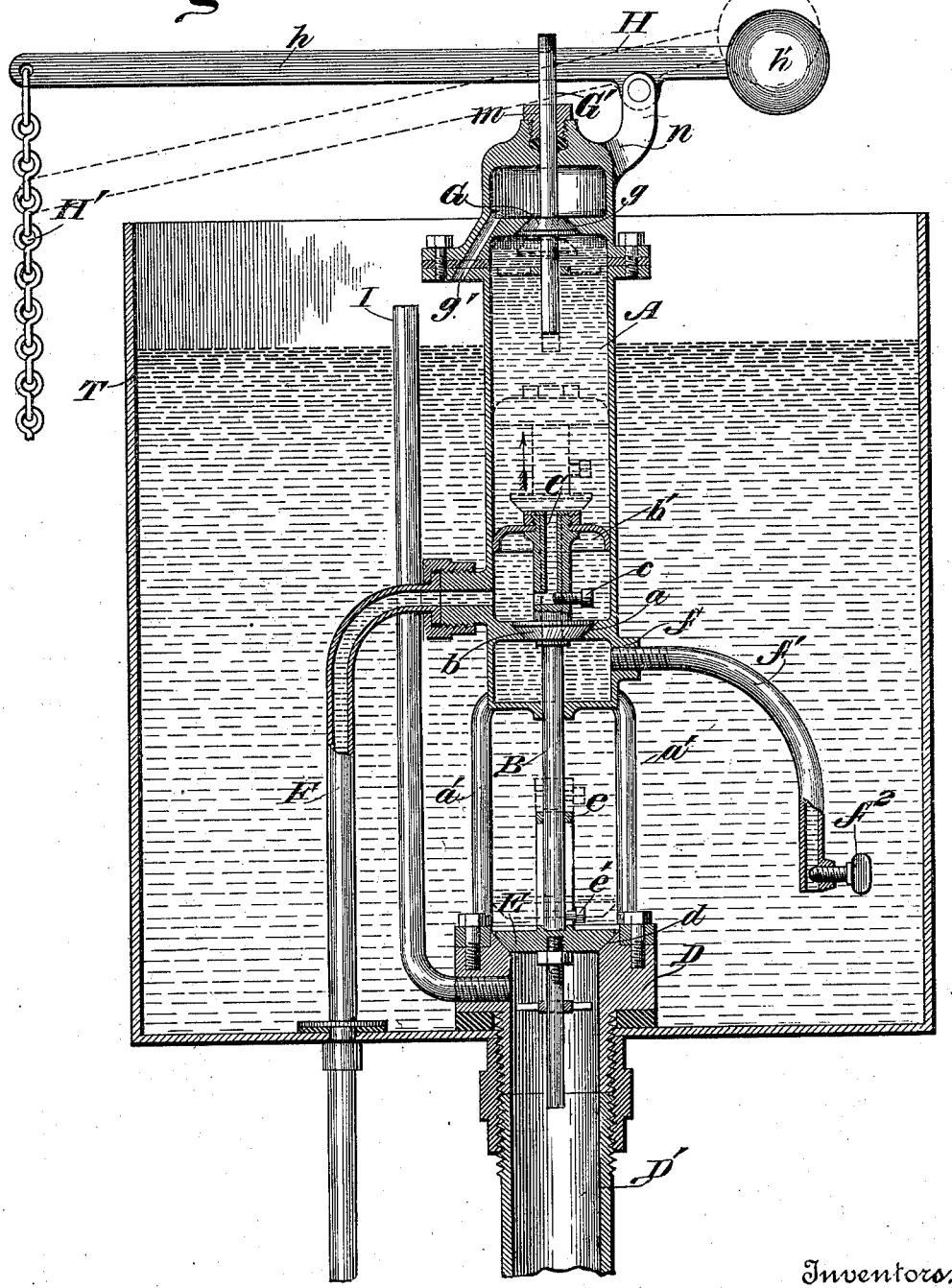
Figure 2:
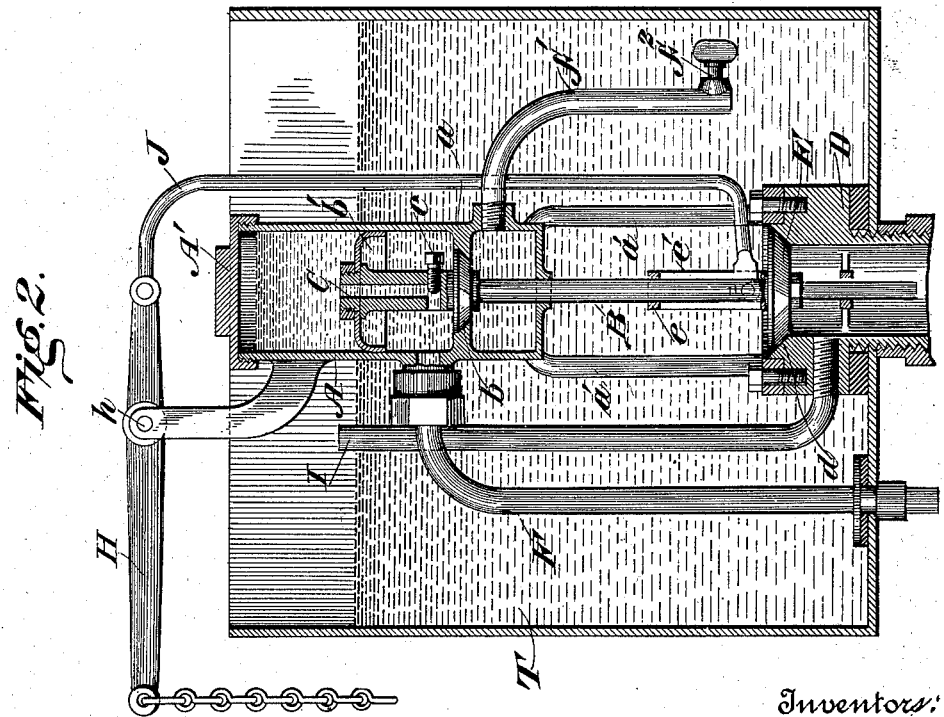

Figure 1 is a vertical section through a tank-valve embodying the invention. Fig. 2 is a similar view showing a modification of the construction of the valve.

A designates a cylinder having a valve-seat $a$ in its lower end, upon which is adapted to seat a valve $b$ on a stem B, which stem extends through valve $b$ and above the latter is provided with an inverted-cup-shaped piston $b'$. An air-passage C is made in the upper end of stem B, so as to permit the passage of air or water through the stem B from below to above piston $b'$, the flow through this passage being controlled by a screw $c$ in the stem, as indicated in the drawings.

The cylinder A is supported within a tank T of any suitable construction by means of the uprights $a'$, which are preferably fastened to a nipple D, extending through the bottom of the tank and provided with a valve-seat $d$, which forms the outlet from the tank and is closed by a valve E, which has a tubular stem $e$, in which loosely fits the lower end of the stem B, there being a pin-and-slot connection $e'$ between the stems B and $e$, so as to permit valve E to close before valve $b$ and to open after the latter valve is opened.

The nipple D is connected by a pipe D' to a water-closet or other place to be flushed, and water is admitted into the cylinder A above the valve-seat $a$, but below the piston $b'$, through a pipe F, connected to any suitable source of supply, and water escapes from the cylinder below the valve-seat $a$ through an outlet $f$, connected to a pipe $f'$, which extends nearly to the bottom of the tank and is provided with a regulating-screw $f^2$ in its lower end, by which the escape of water into the tank can be regulated. The upper end of the cylinder A is provided with a valve-seat $g$, which is closed by a vent-valve G, the stem G' of which extends through a stuffing-box $m$ in the upper end of the cylinder and is slotted or otherwise adapted to be loosely engaged by the long arm $h$ of a lever H, which is pivoted on a stationary bracket $n$, extending from the cylinder, as shown. This lever H is weighted, as at $h'$, to normally keep the vent-valve G closed, but may be depressed, so as to open the vent by pulling on the cord or chain H', attached to the outer end of the lever, as shown. Should any water rise in the cylinder A above the valve G, it is directed back into the tank through pipe $g'$, as shown. An overflow-pipe I is provided in the tank, connecting with the nipple D below the valve E to prevent overflow of the tank.

When the valve $b$ is closed, outflow of water is prevented, and this valve will remain closed so long as vent-valve G remains closed, because the pressure above the piston $b'$ and between it and valve G will be sufficient to force the valve $b$ and piston $b'$ downward until valve $b$ is seated; but when lever H is depressed, thereby opening valve G, the pressure upon piston $b'$ is released and immediately, because of the unequal areas of the valve $b$ and piston $b'$, the water-pressure in the cylinder between them forces piston $b'$ upward, thereby unseating valve $b$ and allowing water to escape more or less rapidly into the tank through the pipe $f'$. The parts are so proportioned that when the valve G is unseated the pressure of water will suffice to raise the valve $b$ and piston $b'$ in the cylinder, as described, sufficiently to unseat valve E, thereby permitting the water in the tank to escape into pipe D' and flush the closet. The valve G, however, will be eventually closed by the weight $h'$ or by the upward movement of the valve $b$ and piston $b'$, and as soon as valve G is closed the ascent of the valve and piston is arrested, and owing to the collection of air or air and water in the cylinder above the piston and owing to the natural gravity of valve and piston, aided by that of valve E, the valves begin to slowly descend, their closure being governed by the amount of air or water allowed to escape above piston $b'$ through the passage C, and the valves will move down until valves E and $b$ are seated, when the supply of water through pipe $f'$ will be cut off and remain so until the valve G is again unseated, when the above-described action will be repeated.

In the modification shown in Fig. 2 the valve G is omitted, and instead of using it the upper part of the cylinder A is tightly closed, as at $A'$, and the short arm of lever H is directly connected by a link-rod J with the lower end of stem B, so that by depressing lever H the valve $b$ and piston $b'$ will be raised, thereby permitting water to flow into the tank, as before, but doing away with automatic opening action of the valve, as in the former case. During the raising of the valve and piston the air or water confined in the chamber A will pass down below the piston $b'$, around the edges thereof, and through the passage C. As soon as the lever is released the valve will be closed by the accumulation of air and water above the piston $b'$, just as in the first instance.

Having thus fully described and ascertained the nature of our said invention, what we therefore claim as new, and desire to secure by Letters Patent of the United States, is—

1. The combination of the cylinder, the water inlet and outlet thereof, the valve adapted to close said outlet, and a piston connected with the outlet-valve but arranged above the water-inlet; with a tank within which said cylinder is placed, an outlet for said tank, a valve for closing said outlet, and means whereby the tank-valve is operated by the piston within the cylinder.

2. The combination of the cylinder, the water inlet and outlet thereof and the valve-stem, a valve thereon adapted to close said outlet, and a piston on the upper end of said stem, arranged to always lie above the water-inlet, and a passage through said stem opening into the cylinder at a point above the piston, with a tank within which said cylinder is placed, an outlet for said tank, a valve for closing said outlet, and means whereby the tank-valve is operated from the valve within the cylinder.

3. The combination of a flushing-tank, the outlet-valve thereof, the cylinder above said valve having a water-outlet into the tank and a water-inlet to the cylinder above the outlet, and a valve-seat interposed between said outlet and inlet; with a valve adapted to fit said seat, provided with a stem extending above the valve into the cylinder and also extending below the cylinder and loosely connected with the tank-valve, and a piston on the stem within the cylinder above the water-inlet.

4. The combination of a flushing-tank, the outlet-valve thereof, the cylinder above said valve having a water-outlet into the tank and a water-inlet to the cylinder above the outlet, a valve-seat interposed between said outlet and inlet, and a valve adapted to fit said seat, provided with a stem extending above the valve into the cylinder and loosely connected below the cylinder with the tank-valve; with a piston on the stem within the cylinder above the water-inlet and an air-passage through the stem extending from a point between the valve and piston thereon within the cylinder to and above the piston.

5. The combination of a flushing-tank, the outlet-valve thereof, the cylinder above said valve having a water-outlet into the tank and a water-inlet above the outlet, a valve adapted to close said outlet provided with a stem extending above the valve into the cylinder and below the valve to and loosely connected with the stem of the tank outlet-valve; with a piston on the stem within the cylinder above the water-inlet, an air-passage through the stem extending from a point between the valve and piston in the cylinder to and above the piston, a vent in the cylinder above the piston, a valve for closing said vent, and means for operating the vent-valve, for the purpose and substantially as described.

6. The combination of a flushing-tank, the outlet-valve thereof, the cylinder above said valve having a water-outlet into the tank and a water-inlet to the cylinder above the outlet, a valve-seat interposed between said outlet and inlet, and a valve adapted to fit said seat, provided with a stem extending above the valve into the cylinder, and loosely connected below the cylinder to the stem of the tank-valve; with a piston on the stem within the cylinder above the water-inlet, an air-passage through the stem extending from a point between the valve and piston in the cylinder to and above the piston, a vent at the upper end of the cylinder, a valve for closing said vent, means for normally closing the vent-valve, and means for regulating the escape of water from the cylinder into the tank when the valves in the cylinder are unseated, for the purpose and substantially as described.

In testimony that we claim the foregoing as our own we affix our signatures in presence of two witnesses.

FRED WILLIAM MEYER.
CHRISTIAN HORST.

In presence of—
CHARLES BECK,
Z. W. ZANG.